US012747783B2

(12) United States Patent
Tang et al.

(10) Patent No.: US 12,747,783 B2
(45) Date of Patent: Sep. 29, 2026

(54) AUTO-COMPENSATION-TYPE GUIDE DEVICE FOR MOVING COIL OF LARGE-SCALE VIBRATION TABLE AND OPERATION METHOD THEREOF

(71) Applicants: China University of Mining and Technology, Jiangsu (CN); SUZHOU DONGLING VIBRATION TEST INSTRUMENT CO., LTD., Jiangsu (CN)

(72) Inventors: Yu Tang, Jiangsu (CN); Tengbo Ye, Jiangsu (CN); Xiaohong Fu, Jiangsu (CN); Hao Lu, Jiangsu (CN); Yuxing Peng, Jiangsu (CN); Xiangdong Chang, Jiangsu (CN); Gang Shen, Jiangsu (CN); Zhencai Zhu, Jiangsu (CN); Hongguang Li, Jiangsu (CN); Guang Meng, Jiangsu (CN); Xianbo Liu, Jiangsu (CN); Jinlong Tang, Jiangsu (CN)

(73) Assignees: China University of Mining and Technology, Jiangsu (CN); SUZHOU DONGLING VIBRATION TEST INSTRUMENT CO., LTD., Jiangsu (CN)

( * ) Notice: Subject to any disclaimer, the term of this patent is extended or adjusted under 35 U.S.C. 154(b) by 0 days.

(21) Appl. No.: 19/131,525

(22) PCT Filed: Aug. 5, 2024

(86) PCT No.: PCT/CN2024/109749

§ 371 (c)(1),
(2) Date: May 20, 2025

(87) PCT Pub. No.: WO2025/097884

PCT Pub. Date: May 15, 2025

(65) Prior Publication Data

US 2026/0194136 A1 Jul. 9, 2026

(30) Foreign Application Priority Data

Apr. 9, 2024 (CN) ........................ 202410419658.X

(51) Int. Cl.
*F16H 57/12* (2006.01)
*F15B 1/04* (2006.01)
(Continued)

(52) U.S. Cl.
CPC ............... *F16H 57/12* (2013.01); *F15B 1/04* (2013.01); *F15B 15/1438* (2013.01);
(Continued)

(58) Field of Classification Search
CPC .......... F16H 57/12; F16H 57/01; F16H 19/08; F16H 2057/126; G08B 21/24;
(Continued)

(56) References Cited

U.S. PATENT DOCUMENTS

| | | | | |
|---|---|---|---|---|
| 2,895,342 A * | 7/1959 | Hayhurst | F16H 57/12 74/409 |
| 5,680,836 A * | 10/1997 | Pierik | F16H 35/008 123/90.31 |
| 9,512,900 B2 * | 12/2016 | Hederstad | F16H 1/2836 |

FOREIGN PATENT DOCUMENTS

| | | |
|---|---|---|
| CN | 104180842 | 12/2014 |
| CN | 107061414 | 8/2017 |

(Continued)

OTHER PUBLICATIONS

"International Search Report (Form PCT/ISA/210) of PCT/CN2024/109749," mailed on Jan. 4, 2025, with English translation thereof, pp. 1-6.

(Continued)

*Primary Examiner* — Jake Cook
(74) *Attorney, Agent, or Firm* — JC ONE WORLD

(57) ABSTRACT

An auto-compensation-type guide device for a moving coil of a large-scale vibration table includes a table body fixed at
(Continued)

one side of a moving coil. A piston cylinder body is fixedly connected on an upper part of the table body. A force transmission assembly is slidably arranged in a cavity proximate to one side of the moving coil in the piston cylinder body, one end of the force transmission assembly is abutted on a piston head plate inside the piston cylinder body, and the other end is extended out of the piston cylinder body and is in transmission-connection with the moving coil. A pressurized cavity is located on the other side of the piston head plate on the piston cylinder body, and the wall of the pressurized cavity is provided with the oil and gas inlets. The oil and gas compensation pipeline is in connection with the oil and gas inlet on the pressurized cavity.

10 Claims, 4 Drawing Sheets

(51) Int. Cl.

| | |
|---|---|
| ***F15B 15/14*** | (2006.01) |
| ***F15B 19/00*** | (2006.01) |
| ***F16H 19/08*** | (2006.01) |
| ***F16H 57/01*** | (2012.01) |
| ***G08B 21/24*** | (2006.01) |

(52) U.S. Cl.
CPC ............ *F15B 19/00* (2013.01); *F16H 57/01* (2013.01); *G08B 21/24* (2013.01); *F16H 19/08* (2013.01); *F16H 2057/126* (2013.01)

(58) Field of Classification Search
CPC ........ F15B 19/00; F15B 15/1438; F15B 1/04; B06B 1/00; B06B 1/045; B06B 2201/53; H02K 1/34
See application file for complete search history.

(56) References Cited

FOREIGN PATENT DOCUMENTS

| | | |
|---|---|---|
| CN | 217873913 | 11/2022 |
| CN | 217930760 | 11/2022 |
| CN | 118002454 | 5/2024 |
| JP | 2002156308 | 5/2002 |
| JP | 2008151521 | 7/2008 |
| KR | 20160066745 | 6/2016 |

OTHER PUBLICATIONS

"Written Opinion of the International Searching Authority (Form PCT/ISA/237) of PCT/CN2024/109749," mailed on Jan. 4, 2025, pp. 1-4.

* cited by examiner

AUTO-COMPENSATION-TYPE GUIDE DEVICE FOR MOVING COIL OF LARGE-SCALE VIBRATION TABLE AND OPERATION METHOD THEREOF

CROSS-REFERENCE TO RELATED APPLICATION

This application is a 371 of international application of PCT application serial no. PCT/CN2024/109749, filed on Aug. 5, 2024, which claims the priority benefit of China application no. 202410419658.X, filed on Apr. 9, 2024. The entirety of each of the above-mentioned patent applications is hereby incorporated by reference herein and made a part of this specification.

TECHNICAL FIELD

The present disclosure relates to the field of the electric vibration tables, and specifically related to an auto-compensation-type guide device for a moving coil of a large-scale vibration table and an operation method thereof.

RELATED ART

Electric vibration table is mainly utilized for the reliability test of the complete products and the parts in the departments such as the aviation, aerospace, weapons, electronics, ships, machinery, energy, chemical industry and instrumentation, and can also be utilized for the characteristic research on the structural dynamics. The operating principle of the electric vibration is that the excitation coil is fed with a direct current to generate a constant magnetic field, and the magnetic lines are cut by the driving coil fed with the alternating current to generate the electromagnetic force, if the direction of the current is changed, the corresponding alternating motion is generated, that is the electromagnetic force. The structure of the electric vibration table is mainly formed by the moving system (moving coil and driving coil), the magnetic circuit system, the elastic supporting system, the guide device and the cooling device.

The guide device is a motion constraint mechanism, the function of the guide device is to accurately position the moving coil and limit the unnecessary lateral motion, thereby ensuring the reciprocating motion of the moving coil in the axial direction. As the vibration table is gradually developed towards the direction of the high thrust, and the load eccentricity phenomenon is unavoidable to lie in the vibration test of the large-scale structures, which causes the vibration table guide device to bear a relative large axial load, in this condition, the traditional guide device for the moving coil formed by the components such as the adjustable pressure block, the gear and the racks has the following problems.

First, under the action of the relative large axial loads, the wear of the guide device is aggravated, and the frequent manual monitoring of the wear state is required, so that the online automatic monitoring of the key wear state cannot be implemented.

Second, after the guide device is wore, the wear clearance is required to be adjusted and compensated by the manual work, and the control of adjustment quantity is depended on the manual experience.

Third, the differences are currently generated in the pre-tightening states among the plurality of the guide devices, which can easily aggravate the wear of parts of the guide devices.

Therefore, it is urgently required to invent a guide device for a moving coil that can automatically compensate for the wear clearance and adapt to the large-scale vibration tables.

SUMMARY OF INVENTION

In view of the above-mentioned technical deficiencies, the objectives of the present disclosure are to propose an auto-compensation-type guide device for a moving coil of a large-scale vibration table and an operation method thereof, which can not only solve the problems that the conventional guide devices are prone to be wore and loose, require to rely on the manual adjustment, and cannot compensate for the wear quantity in real time under the operating condition of the relative large axial loads, but also monitor the wear of the gear-type guide-wheel mechanism and feedback the excessive wearing quantity in time. An operation method of the device is further provided in the present disclosure.

In order to solve the above technical problems, the following technical solutions are adopted in the present disclosure.

Provided is an auto-compensation-type guide device for a moving coil of a large-scale vibration table. The device includes the following.

A piston cylinder body is fixed on a table body located at one side of the moving coil. A power transmission assembly is slidably arranged in a cavity proximate to one side of the moving coil in the piston cylinder body, one end of the power transmission assembly is abutted on a piston head plate inside the piston cylinder body, and another end of the power transmission assembly is extended out of the piston cylinder body and is in transmission-connection with the moving coil through a gear-type guide-wheel mechanism, a cavity located on another side of the piston head plate on the piston cylinder body is a pressurized cavity, and a wall of the pressurized cavity is provided with an oil and gas inlet.

An oil and gas compensation pipeline is in connection with the oil and gas inlet of the pressurized cavity, a pressure sensor and a micro accumulator are arranged in the oil and gas compensation pipeline, the pressure sensor is configured to detect an oil pressure or a gas pressure in the piston cylinder body, and a pressure is supplied to the pressurized cavity by the micro accumulator to auto-compensate a wear of the gear-type guide-wheel mechanism.

The power transmission assembly is a one-way power transmission assembly, and includes the following.

An ejector block, one end of the ejector block is extended out of the piston cylinder body and is fixedly connected to the gear-type guide-wheel mechanism, another end of the ejector block is located in the piston cylinder body and is slidable relative to the piston cylinder body.

A wedge block is arranged in the piston cylinder body and located between the ejector block and the piston head plate, the wedge block and a wall of an inner cavity of the piston cylinder body are enclosed to form a channel, and the channel includes a tapered channel segment and a straight channel segment in sequence from left to right.

One end of the ejector block is provided with a protrusion adapted to the straight channel segment and a diameter tapered segment adapted to the tapered channel segment, an inclined plane of the diameter tapered segment of the ejector block is in cooperation with an inclined plane of the tapered channel segment of the wedge block to form a tiny gap d, when a horizontal thrust is applied to the ejector block from a right side and the thrust is transmitted to the wedge block, the wedge block is vertically forced to generate a friction $F_s$, and the friction $F_s$ is constantly greater than a horizontal force component $F_t$, and a contact plane between the wedge block and the inner cavity of the piston cylinder body is required to satisfy following friction requirements:

$$\mu \geq \tan \alpha,$$

where μ denotes a relative friction coefficient between the wedge block and the inner cavity of the piston cylinder body, and α denotes an angle between the inclined plane of the tapered channel segment and a horizontal plane.

The oil and gas compensation pipeline includes the micro accumulator, a first pressure sensor, a reversing valve, a second pressure sensor, a one-way valve, a first pipeline and a second pipeline. The one-way valve is installed on a pressurized port of the micro accumulator, an oil and gas outlet of the micro accumulator is in connection with an oil and gas inlet of the reversing valve through the first pipeline, the first pressure sensor is installed on the first pipeline between the micro accumulator and the reversing valve, an oil and gas outlet of the reversing valve is in connection with the second pipeline through a pipe joint, the second pressure sensor is in connection with the second pipeline at the oil and gas outlet of the reversing valve through a pipe joint, the second pipeline at the oil and gas outlet of the reversing valve is in connection with an oil and gas inlet of the piston cylinder body through a pipe joint, the reversing valve is in connection with an output end of a controller, and the first pressure sensor and the second pressure sensor are in connection with an input end of the controller.

The device further includes a wear alarm mechanism, the wear alarm mechanism includes an ejector pin, a housing, a spring, and metal contacts, a right end of the housing is fixedly connected to a lower left end surface of the piston cylinder body.

The ejector pin is made of a conductive material, and is in contact with the gear-type guide-wheel mechanism at a left end, and a right end of the ejector pin is inserted into the housing made of a non-conductive material, and a right end surface of a base of the ejector pin is in contact with the spring.

The spring is in contact with a right inner wall of the housing.

The metal contacts are located between a left inner wall of the housing and a left annular surface of the base of the ejector pin, two metal contacts are respectively inserted into upper and lower sides of the housing, and a lower end of each of the metal contacts 304 is extended into the inner wall of the housing, and an upper end of each of the metal contacts is in connection with a wear monitoring alarm circuit.

The gear-type guide-wheel mechanism includes the following.

A first vertical rack is fixedly connected to one end of the ejector block proximate to the moving coil.

A second vertical rack is fixedly connected to the moving coil.

A gear is in connection between the first vertical rack and the second vertical rack, and respectively meshed with the first vertical rack and the second vertical rack.

The gap d between an outer edge surface of the ejector block and the wedge block ranges from 0.1 mm to 0.2 mm.

A horizontal distance between a bottom part of the ejector pin and the metal contact on the inner wall of the housing ranges from 5 mm to 10 mm.

An operation method for the auto-compensation-type guide device for the moving coil of the large-scale vibration table is further provided in the present disclosure. The operation method comprises the following steps.

In S1, according to a thrust requirement of an electric vibration table, the number of the guide devices arranged along a circumferential direction of the moving coil, and a set pressure value $P_{low}$ for the pressurized cavity of the piston cylinder body on the guide device are determined, the guide devices are evenly arranged along the circumferential direction of the moving coil, and a specific formula is as follows:

$$P_{low} = \frac{M}{hS}$$

where

M denotes an anti-overturning moment of the vibration table, h denotes a distance between an upper guide device and a lower guide device, and a distance between the upper guide device and the lower guide device of the vibration table, and the guide device in the present disclosure is the upper guide device, S denotes a compression area of the piston head plate.

In S2, the second pipeline of the oil and gas compensation is in connection with the pressurized cavity of each of the piston cylinder bodies through the pipe joint.

In S3, the reversing valve is opened through the controller, a pressure supply unit is in connection with a valve port of the one-way valve, the micro accumulator and the pressurized cavity on each of the piston cylinder bodies are pressurized, when a pressure value fed back by the second pressure sensor reaches a set value $P_{low}$, the reversing valve is closed by the controller.

In S4, the micro accumulator is continuously pressurized, when a pressure value fed back by the first pressure sensor reaches an initial set value $P_{high}$ for the micro accumulator, the pressurizing is terminated, and the pressure supply unit is removed.

In S5, during an operation of the vibration table, when the pressure value fed back by the second pressure sensor monitored by the controller is less than a set threshold value $\theta_{low}$, a signal is output by the controller to control the reversing valve to open, and the pressurized cavity of the piston cylinder body is pressurized by the micro accumulator, and at the same time, the pressure value fed back by the second pressure sensor is continuously monitored by the controller, and when the monitored pressure value fed back by the second pressure sensor reaches the set value $P_{low}$, the reversing valve is controlled to be closed by the controller.

In S6, when the controller monitors that the pressure value fed back by the first pressure sensor is less than a set threshold value $\theta_{high}$, an alarm is sent by the controller to remind that the micro accumulator is required to be pressurized, otherwise, Step S8 is executed.

In S7, the pressure supply unit is in connection with the valve port of the one-way valve to pressurize, when the controller monitors that the pressure value fed back by the first pressure sensor reaches the set threshold value $P_{high}$, the pressurizing is terminated, and the pressure supply unit is removed.

In S8, when the controller monitors that the base of the ejector pin of the wear alarm mechanism is in contact with the metal contacts, the wear monitoring alarm circuit is connected, an alarm is triggered to remind that the gear-type guide-wheel mechanism is wore excessively and is required to be replaced.

In S9, the above steps S5 to S8 are repeated.

The number of the guide devices arranged along a circumferential direction of the moving coil is four, six or eight.

The initial set value $P_{high}$ for the micro accumulator is valued from $1.3P_{low}$ to $1.5P_{low}$.

The set threshold $\theta_{high}$ for the pressure value fed back by the first pressure sensor is valued from $P_{low}$ to $1.1P_{low}$.

The set threshold θlow for the pressure value fed back by the second pressure sensor is valued from $0.85P_{low}$ to $0.9P_{low}$.

The beneficial effects of the present disclosure lie in the following.

(1) In the device of the present disclosure, the problem that the wearing of the existing guide device of the vibration table is aggravated due to the deviation generated by the larger axial loads is solved by the characteristic of the self-locking of reverse stroke of the wedge block, and in the present disclosure, a pressure can be supplied to the pressurized cavity of the guide device by the oil and gas compensation pipeline through utilizing the gap between the wedge block and the ejector block to provide the sufficient pre-tightening force.

(2) In the present disclosure, the problems that the existing guide device cannot compensate for the wear quantity of the moving coil in real time and still requires the manual adjustment are solved. In the present disclosure, the pressure in the pressurized cavity can maintained within a selected range by the oil and gas compensation pipeline, so that the wear quantity of the gear is adaptively compensated, the motion of the first rack is limited, the gear is prevented from lateral displacement, without relying on the manual experience.

(3) The pressures are simultaneously supplied to all guide devices by the oil and gas compensation pipeline to ensure that the pressure of each of the guide devices is equal, the differences in the pre-tightening state among the plurality of the guide devices are eliminated, and the wear of the guide devices are reduced.

(4) In the present disclosure, the problems that the existing guide device cannot monitor the wear quantity of the moving coil in real time and still requires the manual adjustment are solved. Under the condition that the wear of the gear is excessive, the base of the ejector pin of the wear alarm mechanism in the present disclosure is in contact with the metal contact, which triggers the wear monitoring alarm circuit, and sends an early warning to remind that the gear-type guide-wheel mechanism is wore excessively and required to be replaced, thereby improving the safety of the vibration table guide system.

(5) The present disclosure has a simple structure, is prone to be operated, convenient to be maintained, has a strong adaptability and high practicality.

Figure 1:
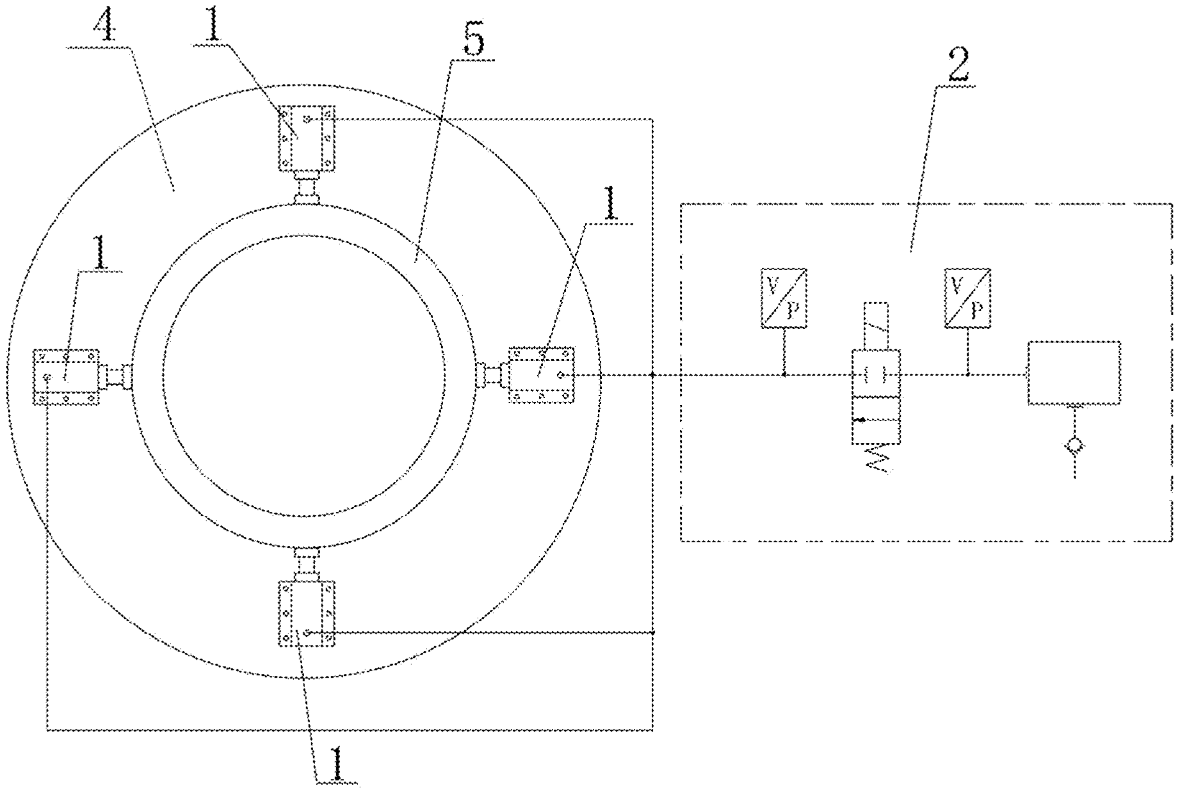
FIG. 1 illustrates a top view of a guide device for a vibration table of the present disclosure.
Figure 2:
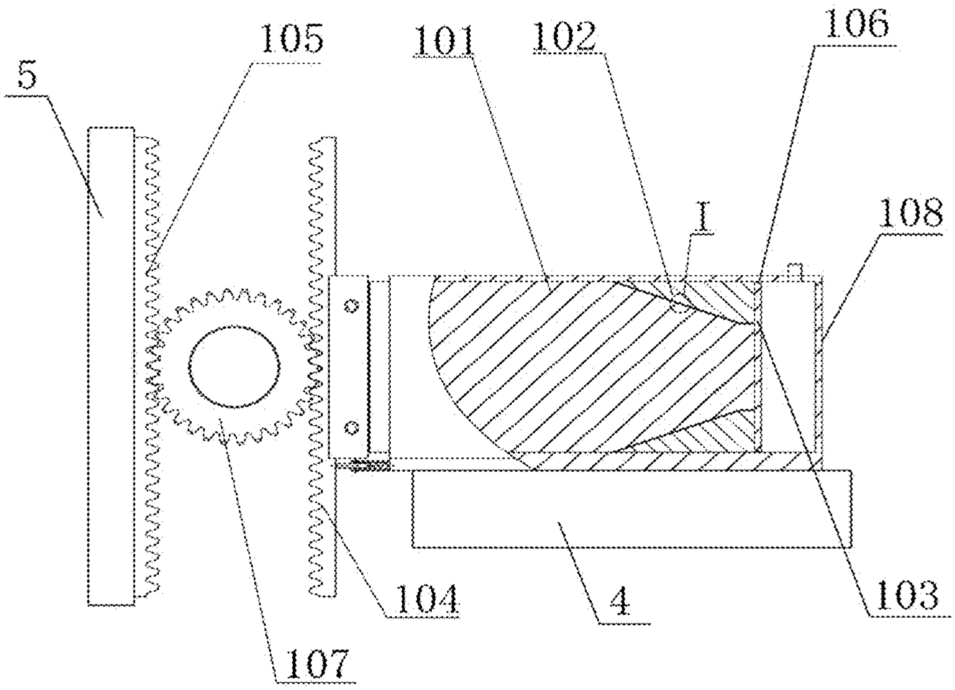
FIG. 2 illustrates a schematic diagram of a structure of the guide device of the present disclosure.
Figure 3:
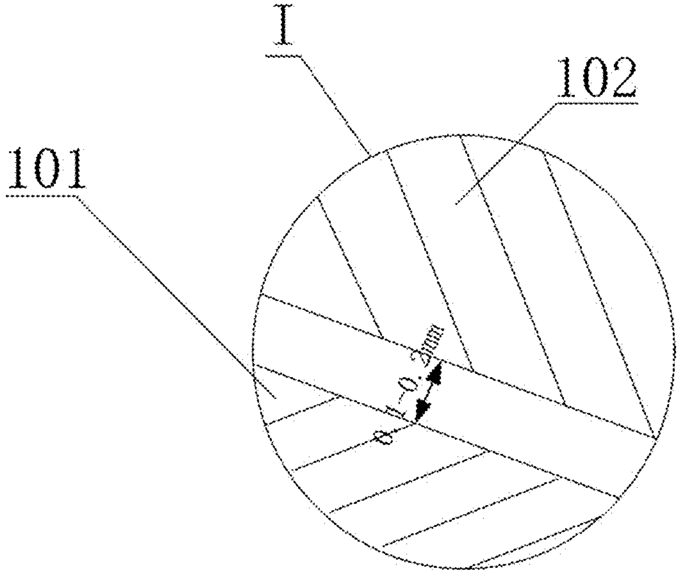
FIG. 3 illustrates a partial schematic diagram of the guide device of the present disclosure.

In the figures: 1. Guide device; 101. Ejector block; 102. Wedge block; 103. Piston head plate; 104. First rack; 105. Second rack; 106. Sealing ring; 107. Gear; 108. Piston cylinder body; 2. Oil and gas compensation pipeline; 201. Micro accumulator; 202. First pressure sensor; 203. Reversing valve; 204. Second pressure sensor; 205. One-way valve; 206. First pipeline; 207. Second pipeline; 3. Wear alarm mechanism; 301. Ejector pin; 302. Housing; 303. Spring; 304. Metal contact; 4. Table; 5. Moving coil.

DESCRIPTION OF EMBODIMENTS

The technical solutions of the embodiments of the present disclosure will be clearly and completely described below with reference to the accompanying drawings of the embodiments of the present disclosure. Obviously, the described embodiments are merely a part of the embodiments of the present disclosure, not all of the embodiments. Based on the embodiments of the present disclosure, all other embodiments obtained by those of ordinary skilled in the art without creative work are within the protection scope of the present disclosure.

As illustrated in FIGS. 1 to 7, an auto-compensation-type guide device for a moving coil of a large-scale vibration table includes a guide device 1, an oil and gas compensation pipeline 2, and a wear alarm mechanism 3.

The guide device 1 includes an ejector block 101, a wedge block 102, a piston head plate 103, a first rack 104, a second rack 105, a sealing ring 106, a gear 107, and a piston cylinder body 108. The cross-section of the ejector block 101 at the right end is a convex structure, and is symmetrical about the central axis of the ejector block 101. The structure is symmetrical along the central axis. This design is reflected in the fact that the angles between the inclined planes of the ejector block 101 and the reference planes (horizontal or vertical) are consistent, and the angles between the inclined planes of the inner walls of the wedge block 102 and the reference plane (horizontal or vertical) are consistent. Specifically, the angles between the upper and lower inclined planes of the ejector block 101 and the horizontal plane, as well as the angles between the front and rear inclined planes of the ejector block 101 and the vertical plane, are all equal. Similarly, the angles between the upper and lower inclined planes of the inner wall of the wedge block 102 and the horizontal plane, as well as the angles between the front and rear inclined planes of the inner wall of wedge block 102 and the vertical plane, are all equal. The wedge block 102 is provided with through holes. The left end face of the ejector block 101 is in connection with the right end face of the first rack 104, and the ejector block 101 can only make the relative motion along the axial direction of the piston cylinder body 108. The right end of the ejector block 101 is inserted into the piston cylinder 108 body, and a gap is generated between the outer edge of the right end of the ejector block 101 and the inner wall of the wedge block 102. A piston top plate 103 is arranged inside the piston cylinder body 108. A gap between the outer edge of the piston head plate 103 and the piston cylinder body 108 is eliminated by a sealing ring 106. A pressurized chamber is formed by the right side of the piston head plate 103 and the inner wall of the piston cylinder body 108, and the piston cylinder body 108 is provided with a first pressurized port at the upper right side. The right plane of the wedge block 102 is in connection with the piston top plate 103, and the outer edges of the wedge block 102 are respectively in contact with the inner walls of the piston cylinder body 108. The first rack 104 is meshed with the gear 107, the gear 107 is meshed with the second rack 105, and the second rack 105 is fixedly connected to the moving coil 4 at the left side.

The oil and gas compensation pipeline 2 includes a micro accumulator 201, a first pressure sensor 202, a reversing valve 203, a second pressure sensor 204, a one-way valve 205, a first pipeline 206 and a second pipeline 207. The one-way valve 205 is installed on the second pressurized port of the micro accumulator 201. An oil outlet of the micro accumulator 201 is in connection with an oil inlet of the reversing valve 203 through a first pipeline 206. The first pressure sensor 202 is installed on the first pipeline 206 between the micro accumulator 201 and the reversing valve 203. An oil outlet of the reversing valve 203 is in connection with the second pipeline 207 through a pipe joint. The second pressure sensor 204 is in connection with the second pipeline 207 at the oil outlet of the reversing valve through a pipe joint. The second pipeline 207 at the oil outlet of the reversing valve 203 is in connection with the first pressurized port of the piston cylinder body 108 through a pipe joint. The reversing valve 203 is in connection with an output end of the controller, and the first pressure sensor 202 and the second pressure sensor 204 are in connection with the input end of the controller.

The wear alarm mechanism 3 includes an ejector pin 301, a housing 302, a spring 303, and metal contacts 304. The right end of the housing 302 is fixedly connected to the lower left end surface of the piston cylinder body 108 of the guide device 1. The ejector pin 301 is in contact with the first rack 104 at the left end. The right end of the ejector pin 301 is inserted into the housing 302, and the right end surface of the base of the ejector pin 301 is in contact with the spring 303. The spring 303 is in contact with the right inner wall of the housing 302. The metal contact 304 is located between the left inner wall of the housing 302 and the left annular surface of the base of the ejector pin 301. The two metal contacts 304 are respectively inserted into the upper and lower sides of the housing 302, the lower end of each of the metal contacts 304 is extended into the inner wall of the housing 302, and the upper end of each of the metal contacts 304 is in connection with the wear monitoring alarm circuit.

As one preferred embodiment of the present disclosure, the piston cylinder body 108 is a square shell.

Figure 4:
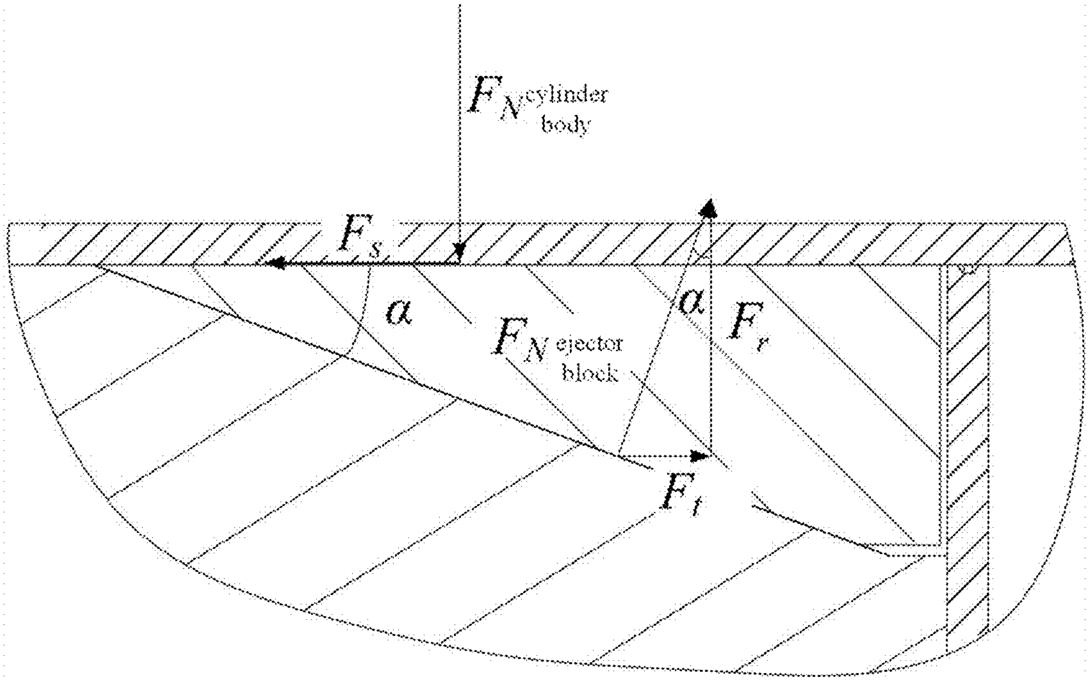
FIG. 4 illustrates a schematic diagram of a self-locking force of a wedge block of the present disclosure.
Figure 5:
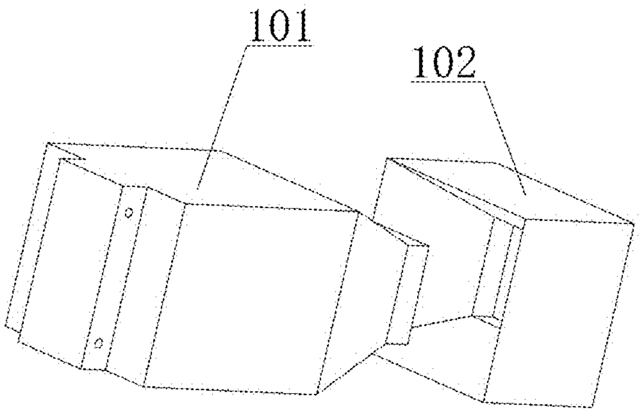
FIG. 5 illustrates an exploded schematic diagram of an assembly of an ejector block and the wedge block of the present disclosure.
Figure 6:
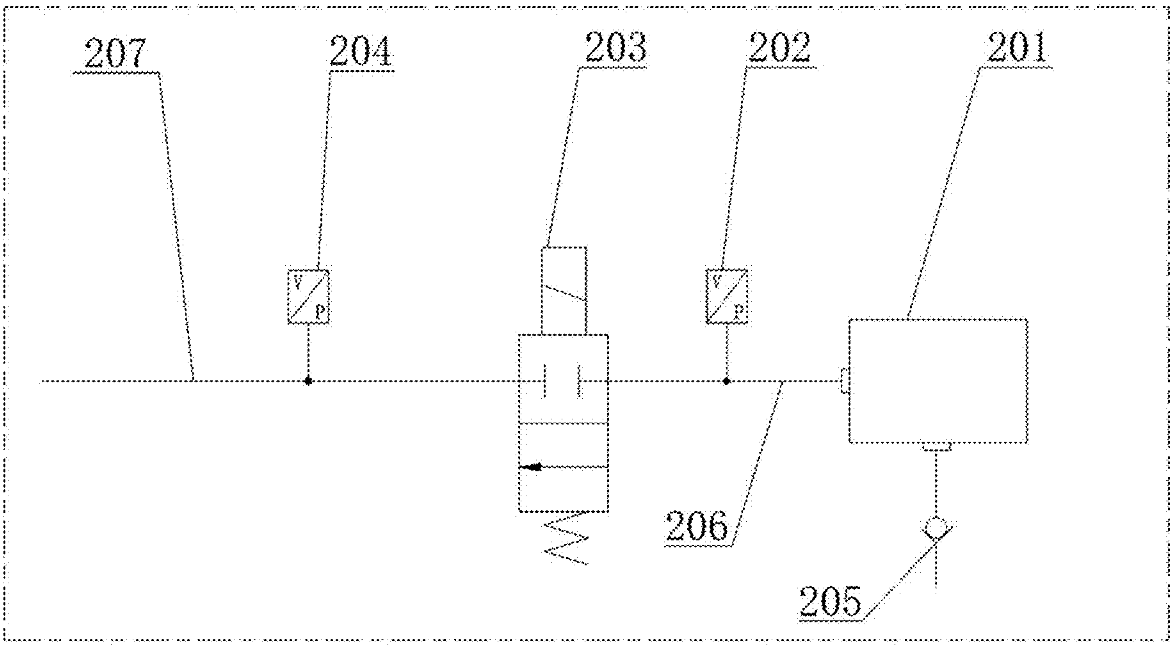
FIG. 6 illustrates a schematic diagram showing the principle of the oil and gas compensation pipeline of the present disclosure.
Figure 7:
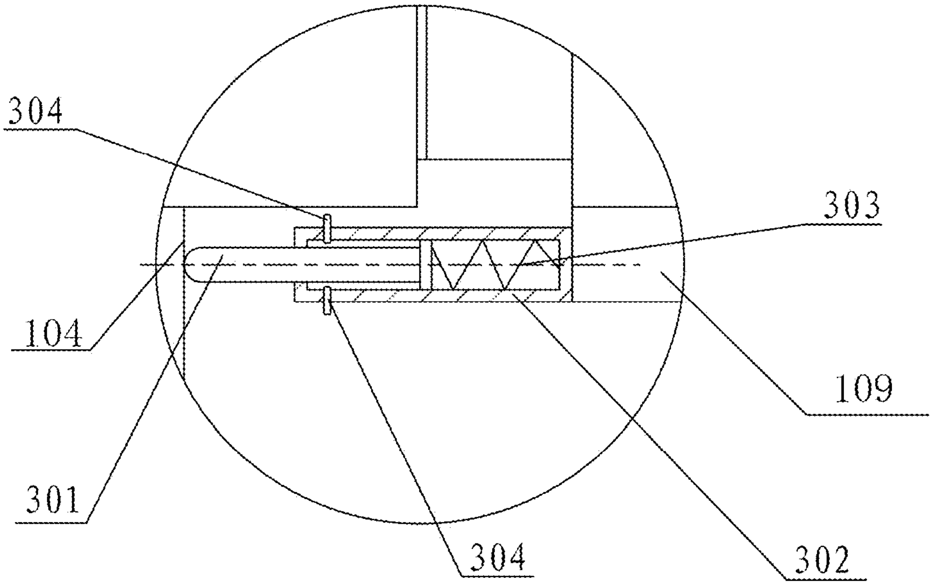
FIG. 7 illustrates a schematic diagram of a structure of a wear alarm mechanism of the present disclosure.

As illustrated in FIG. 4, the force of the wedge block 12 is analyzed as follows. When a horizontal thrust is applied to the ejector block 101 from the right side, and the thrust is transmitted to the wedge block 102, a friction force $F_s$ of the wedge block 102 generated by the vertical force $F_{N\ cylinder\ body}$ of the piston cylinder is constantly greater than a horizontal component force $F_t$ of the force $F_{N\ ejector\ block}$ transmitted from the thrust to the wedge block. Therefore, the contact plane between the wedge block 102 and the inner cavity of the piston cylinder body 108 satisfies the following friction requirements:

$$\mu \geq \tan \alpha,$$

where μ denotes a relative friction coefficient between the outer edge surface of the wedge block 102 and the inner wall of the piston cylinder body 108, α denotes angles between inclined planes of the inner walls of the wedge block 102 and the reference planes (horizontal plane and vertical plane).

The through hole of the wedge block 102 is a square hole or a round hole.

The gap between the outer edge surface of the ejector block 101 and the inner wall of the wedge block 102 ranges from 0.1 mm to 0.2 mm.

The ejector pin 301 is made of the conductive material.

The distance between the bottom of the ejector pin 301 and the metal contact 304 on the inner wall of the housing 302 ranges from 5 mm to 10 mm.

The existing products or the structures well known to those skilled in the art are adopted by the second rack 105, the gear 107, the piston cylinder body 108, the micro accumulator 201, the first pressure sensor 202, the reversing valve 203, the second pressure sensor 204, the one-way valve 205, the first pipeline 206, the second pipeline 207, and the housing 302 of this embodiment, and the existing connection way well known to those skilled in the art is also adopted by the connection ways between them, which will not be described in detail herein.

An operation method for the auto-compensation-type guide device for the moving coil of the large-scale vibration table is provided, and the method comprises the following steps.

In Step a), according to the thrust requirement of the electric vibration table, the number of the guide devices 1 arranged along a circumferential direction of the moving coil 4 and the set pressure value $P_{low}$ for the pressurized cavity of the piston cylinder body 108 on the guide device 1 are determined, and the guide devices 1 are evenly arranged along the circumferential direction of the moving coil 4, and the specific formula is as follows:

$$P_{low} = \frac{M}{hS},$$

where

M denotes an anti-overturning moment of the vibration table, h denotes a distance between the upper guide device and the lower guide device, a distance between the upper guide device and the lower guide device of the vibration table, and the guide device is the upper guide device in the present disclosure, S denotes a compression area of the piston head plate 103.

In Step b), the pipeline 206 of the wear driving module 2 is in connection with the first pressurized port of each of the piston cylinder body 108 on each of the guide devices 1 through the pipe joint.

In Step c), the reversing valve 203 is opened through the controller, the pressure supply unit is in connection with the valve port of the one-way value 205, the micro accumulator 201 and the pressurized cavity of the piston cylinder body 108 on each of the guide devices 1 are pressurized, when the pressure value fed back by the second pressure sensor 204 reaches the set value $P_{low}$, the reversing valve 203 is closed through the controller.

In Step d), the micro accumulator 201 is continuously pressurized, when the pressure value fed back by the first pressure sensor 202 reaches the initial set value $P_{high}$ for the micro accumulator 201, the pressurizing is terminated, and the pressure supply unit is removed.

In Step e), during the operation of the vibration table, when the pressure value fed back by the second pressure sensor 204 monitored by the controller is less than a set threshold value $\theta_{low}$, a signal is output by the controller to control the reversing valve 203 to open, the pressurized cavity of the piston cylinder body 108 is pressurized by the micro accumulator 201, and at the same time, the pressure value fed back by the second pressure sensor 204 is continuously monitored by the controller, and when the monitored pressure value fed back by the second pressure sensor 204 reaches the set value $P_{low}$, and the reversing value 203 is controlled to be closed by the controller.

In Step f), when the controller monitors that the pressure value fed back by the first pressure sensor 202 is less than a set threshold value $\theta_{high}$, an alarm is sent by the controller to remind that the micro accumulator 201 is required to be pressurized, and then Step (g) is executed, otherwise Step (h) is executed.

In Step g), the pressure supply unit is in connection with the valve port of the one-way valve 205 for pressurizing, when the controller monitors that the pressure value fed back by the first pressure sensor 202 reaches the set threshold value $P_{high}$, the pressurizing is terminated, and the pressure supply unit is removed.

In Step h), when the controller monitors that the base of the ejector pin 301 of the wear alarm mechanism 3 is in contact with the metal contacts 304, the wear monitoring alarm circuit is connected, and an alarm is triggered to reminder that the gear 107 is wore excessively, and is required to be replaced.

In Step i), the above steps (e) to (h) are repeated.

In this embodiment, the number of guide devices 1 arranged along the circumferential direction of the moving coil 5 is four.

The oil and gas compensation pipeline 2 of this embodiment is pressurized by the gas pressure or the hydraulic pressure.

In this embodiment, the initial set value $P_{high}$ for the micro accumulator 201 is valued from $1.3P_{low}$ to $1.5P_{low}$.

In this embodiment, the set threshold $\theta_{high}$ for the pressure value fed back by the first pressure sensor 201 is valued from $P_{low}$ to $1.1P_{low}$, and the set threshold $\theta_{low}$ for the pressure value fed back by the second pressure sensor 202 is valued from $0.85P_{low}$ to $0.9P_{low}$.

Obviously, various variations and modification of the present disclosure can be made by those skilled in the art without departing from the spirit and the scope of the present disclosure. Thus, if these modifications and variations of the present disclosure fall within the scope of the claims of the present disclosure and their equivalents, the present disclosure is also intended to include these modifications and variations.

The invention claimed is:

1. An auto-compensation-type guide device for a moving coil of a large-scale vibration table, comprising:

a piston cylinder body, fixed on a table body located at one side of the moving coil, wherein a power transmission assembly is slidably arranged in a cavity proximate to one side of the moving coil in the piston cylinder body, one end of the power transmission assembly is abutted on a piston head plate inside the piston cylinder body, and another end of the power transmission assembly is extended out of the piston cylinder body and is in transmission-connection with the moving coil through a gear-type guide-wheel mechanism, a cavity located on another side of the piston head plate on the piston cylinder body is a pressurized cavity, and a wall of the pressurized cavity is provided with an oil and gas inlet; and an oil and gas compensation pipeline, in connection with the oil and gas inlet of the pressurized cavity, wherein a pressure sensor and a micro accumulator are arranged in the oil and gas compensation pipeline, the pressure sensor is configured to detect an oil pressure or a gas pressure in the piston cylinder body, and a pressure is supplied to the pressurized cavity by the micro accumulator to auto-compensate a wear of the gear-type guide-wheel mechanism.

2. The auto-compensation-type guide device for the moving coil of the large-scale vibration table according to claim 1, wherein the power transmission assembly is a one-way power transmission assembly, and includes:

an ejector block, wherein one end of the ejector block is extended out of the piston cylinder body and is fixedly connected to the gear-type guide-wheel mechanism, another end of the ejector block is located in the piston cylinder body and is slidable relative to the piston cylinder body;

a wedge block, arranged in the piston cylinder body and located between the ejector block and the piston head plate, wherein the wedge block and a wall of an inner cavity of the piston cylinder body are enclosed to form a channel, and the channel includes a tapered channel segment and a straight channel segment in sequence from left to right;

one end of the ejector block is provided with a protrusion adapted to the straight channel segment and a diameter tapered segment adapted to the tapered channel segment, an inclined plane of the diameter tapered segment of the ejector block is in cooperation with an inclined plane of the tapered channel segment of the wedge block to form a tiny gap d, when a horizontal thrust is applied to the ejector block from a right side and the thrust is transmitted to the wedge block, the wedge block is vertically forced to generate a friction $F_s$, and the friction $F_s$ is constantly greater than a horizontal force component $F_t$, and a contact plane between the wedge block and the inner cavity of the piston cylinder body is required to satisfy following friction requirements:

$$\mu \geq \tan \alpha,$$

where μ denotes a relative friction coefficient between the wedge block and the inner cavity of the piston cylinder body, and α denotes an angle between the inclined plane of the tapered channel segment and a horizontal plane.

3. The auto-compensation-type guide device for the moving coil of the large-scale vibration table according to claim 1, wherein the oil and gas compensation pipeline includes the micro accumulator, a first pressure sensor, a reversing valve, a second pressure sensor, a one-way valve, a first pipeline, and a second pipeline, the one-way valve is installed on a pressurized port of the micro accumulator; an oil and gas outlet of the micro accumulator is in connection with an oil and gas inlet of the reversing valve through the first pipeline, the first pressure sensor is installed on the first pipeline between the micro accumulator and the reversing valve, an oil and gas outlet of the reversing valve is in connection with the second pipeline through a pipe joint, the second pressure sensor is in connection with the second pipeline at the oil and gas outlet of the reversing valve through a pipe joint; the second pipeline at the oil and gas outlet of the reversing valve is in connection with an oil and gas inlet of the piston cylinder body through a pipe joint, the reversing valve is in connection with an output end of a controller, and the first pressure sensor and the second pressure sensor are in connection with an input end of the controller.

4. The auto-compensation-type guide device for the moving coil of the large-scale vibration table according to claim 1, wherein the device further includes a wear alarm mechanism, the wear alarm mechanism includes an ejector pin, a housing, a spring, and metal contacts, a right end of the housing is fixedly connected to a lower left end surface of the piston cylinder body;

the ejector pin is made of a conductive material, and is in contact with the gear-type guide-wheel mechanism at a left end, and a right end of the ejector pin is inserted into the housing made of a non-conductive material, and a right end surface of a base of the ejector pin is in contact with the spring;

the spring is in contact with a right inner wall of the housing;

the metal contacts are located between a left inner wall of the housing and a left annular surface of the base of the ejector pin, two metal contacts are respectively inserted into upper and lower sides of the housing, and a lower end of each of the metal contacts is extended into the inner wall of the housing, and an upper end of each of the metal contacts is in connection with a wear monitoring alarm circuit.

5. The auto-compensation-type guide device for the moving coil of the large-scale vibration table according to claim 2, wherein the gear-type guide-wheel mechanism includes:

a first vertical rack, fixedly connected to one end of the ejector block proximate to the moving coil;

a second vertical rack, fixedly connected to the moving coil;

a gear, in connection between the first vertical rack and the second vertical rack, and respectively meshed with the first vertical rack and the second vertical rack.

6. The auto-compensation-type guide device for the moving coil of the large-scale vibration table according to claim 2, wherein the gap d between an outer edge surface of the ejector block and the wedge block ranges from 0.1 mm to 0.2 mm.

7. The auto-compensation-type guide device for the moving coil of the large-scale vibration table according to claim 4, wherein a horizontal distance between a bottom part of the ejector pin and the metal contact on the inner wall of the housing ranges from 5 mm to 10 mm.

8. An operation method for the auto-compensation-type guide device for the moving coil of the large-scale vibration table according to claim 3, comprising following steps, S1, determining, according to a thrust requirement of an electric vibration table, a number of the guide devices arranged along a circumferential direction of the moving coil, and a set pressure value $P_{low}$ for the pressurized cavity of the piston cylinder body on the guide device, evenly arranging the guide devices along the circumferential direction of the moving coil, wherein a specific formula is:

$$P_{low} = \frac{M}{hS},$$

where

M denotes an anti-overturning moment of the vibration table, h denotes a distance between an upper guide device and a lower guide device, and a distance of the upper guide device and the lower guide device of the vibration table, and the guide device is the upper guide device, S denotes a compression area of the piston head plate;

S2, connecting the second pipeline of the oil and gas compensation pipeline with the pressurized cavity of each of the piston cylinder bodies through the pipe joint;

S3, opening, through the controller, the reversing valve, connecting a pressure supply unit with a valve port of the one-way valve, pressurizing the micro accumulator and the pressurized cavity on each of the piston cylinder bodies, wherein when a pressure value fed back by the second pressure sensor reaches a set value $P_{low}$, the reversing valve is closed by the controller;

S4, continuously pressurizing the micro accumulator, terminating, when a pressure value fed back by the first pressure sensor reaches an initial set value $P_{high}$ for the micro accumulator, the pressurizing, and removing the pressure supply unit;

S5, during an operation of the vibration table, outputting, when the pressure value fed back by the second pressure sensor monitored by the controller is less than a set threshold $\theta_{low}$, a signal by the controller to control the reversing valve to open, pressurizing, by the micro accumulator, the pressurized cavity of the piston cylinder body, and at the same time, continuously monitoring, by the controller, the pressure value fed back by the second pressure sensor, and controlling, when the monitored pressure value fed back by the second pressure sensor reaches the set value $P_{low}$, the reversing valve to close by the controller;

S6, sending, by the controller, an alarm to remind that the micro accumulator is required to be pressurized, when the controller monitors that the pressure value fed back by the first pressure sensor is less than a set threshold $\theta_{high}$, otherwise, executing Step S8;

S7, connecting the pressure supply unit with the valve port of the one-way valve to pressurize, terminating, when the controller monitors that the pressure value fed back by the first pressure sensor monitored reaches the set threshold $P_{high}$, pressurizing, and removing the pressure supply unit;

S8, connecting, when the controller monitors that the base of the ejector pin of the wear alarm mechanism is in contact with metal contact, the wear monitoring alarm circuit, triggering an alarm to remind that the gear-type guide-wheel mechanism is wore excessively and is required to be replaced; and S9, repeating the above steps S5 to S8.

9. The operation method for the auto-compensation-type guide device for the moving coil of the large-scale vibration table according to claim 8, wherein a number of the guide devices arranged along a circumferential direction of the moving coil is four, six or eight.

10. The operation method for the auto-compensation-type guide device for the moving coil of the large-scale vibration table according to claim 9, wherein the initial set value $P_{high}$ for the micro accumulator is valued from $1.3P_{low}$ to $1.5P_{low}$;

the set threshold $\theta_{high}$ for the pressure value fed back by the first pressure sensor is valued from $P_{low}$ to $1.1P_{low}$;

the set threshold $\theta_{low}$ for the pressure value fed back by the second pressure sensor is valued from $0.85P_{low}$ to $0.9P_{low}$.

* * * * *